United States Patent [19]
Quiram

[11] 3,853,197
[45] Dec. 10, 1974

[54] SELF-PROPELLED VEHICLE DRIVE

[75] Inventor: Ronald G. Quiram, Michigan City, Ind.

[73] Assignee: Poloron Products of Indiana, Inc., Michigan City, Ind.

[22] Filed: Sept. 15, 1972

[21] Appl. No.: 289,254

[52] U.S. Cl.................... 180/19 R, 74/405, 280/43
[51] Int. Cl............................................. B62d 51/04
[58] Field of Search ........ 180/19 R; 280/43; 74/405

[56] References Cited
UNITED STATES PATENTS

| | | | |
|---|---|---|---|
| 1,124,162 | 1/1915 | Monahan | 180/19 R |
| 1,246,696 | 11/1917 | Ammann | 180/19 R X |
| 1,419,722 | 6/1922 | Dittmar | 180/19 R X |
| 2,689,620 | 9/1954 | Hainke | 180/19 R |
| 2,786,541 | 3/1957 | Conrad | 280/43 X |
| 2,989,874 | 6/1961 | Johnson | 74/405 |
| 3,123,149 | 3/1964 | White | 180/19 R X |

Primary Examiner—Robert G. Sheridan
Assistant Examiner—L. J. Paperner
Attorney, Agent, or Firm—Neuman, Williams, Anderson & Olson

[57] ABSTRACT

A drive system for a vehicle in which a vehicle frame is adjustable relative to the support wheels, including a worm wheel affixed to a wheel axle, and an elongated driven worm screw mounted on the frame and extending adjacent the various positions assumed by the worm wheel as the frame is adjusted relative to the axle, the worm screw being selectively movable laterally into engagement with the worm gear in any adjustment position of the frame for driving the support wheel from a motor on the frame in any such position.

15 Claims, 6 Drawing Figures

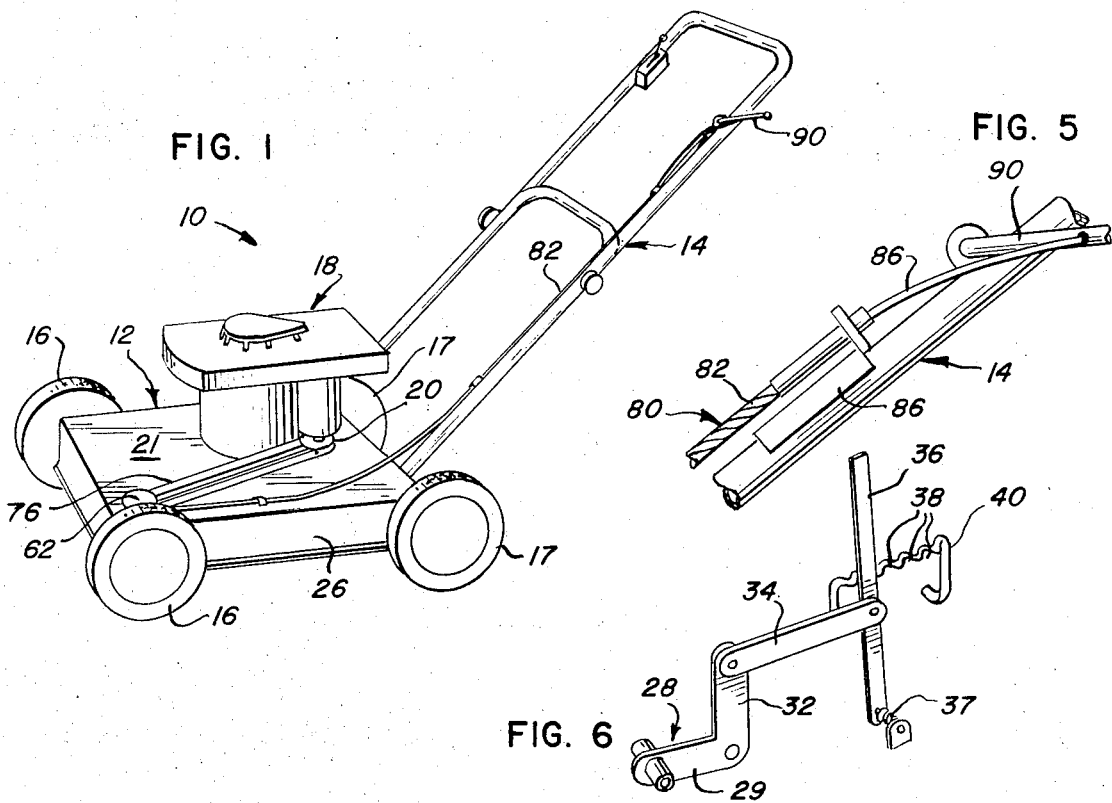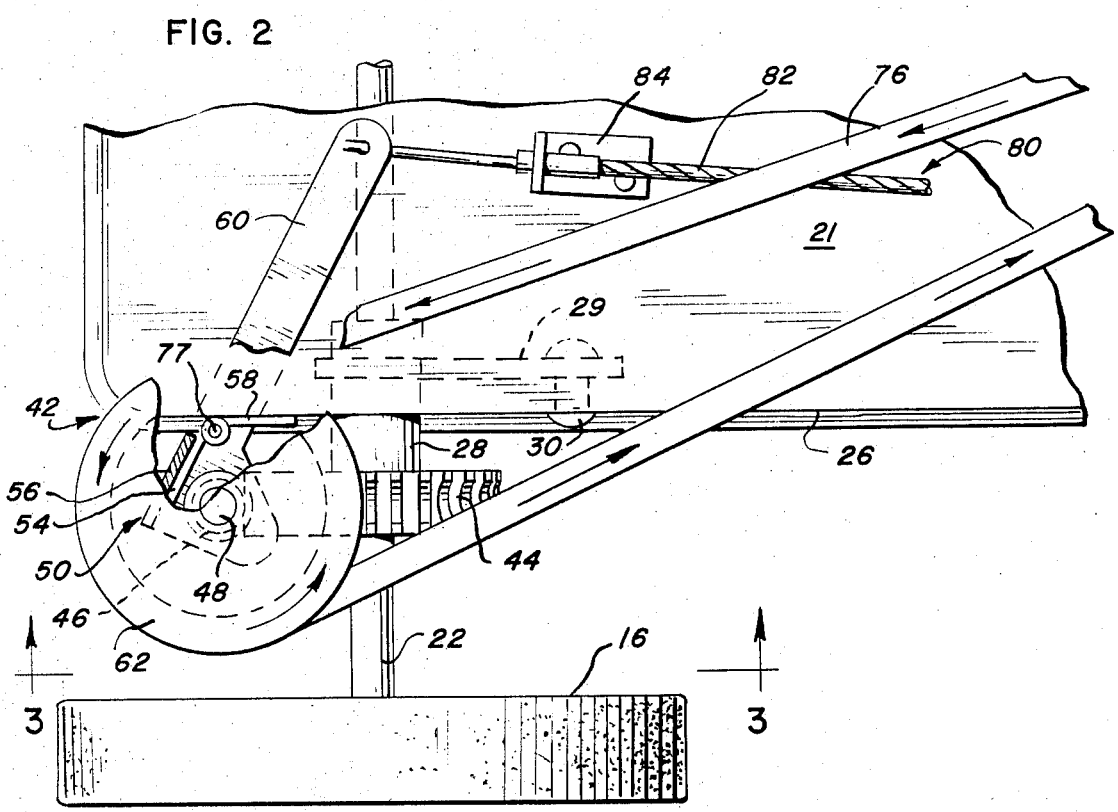

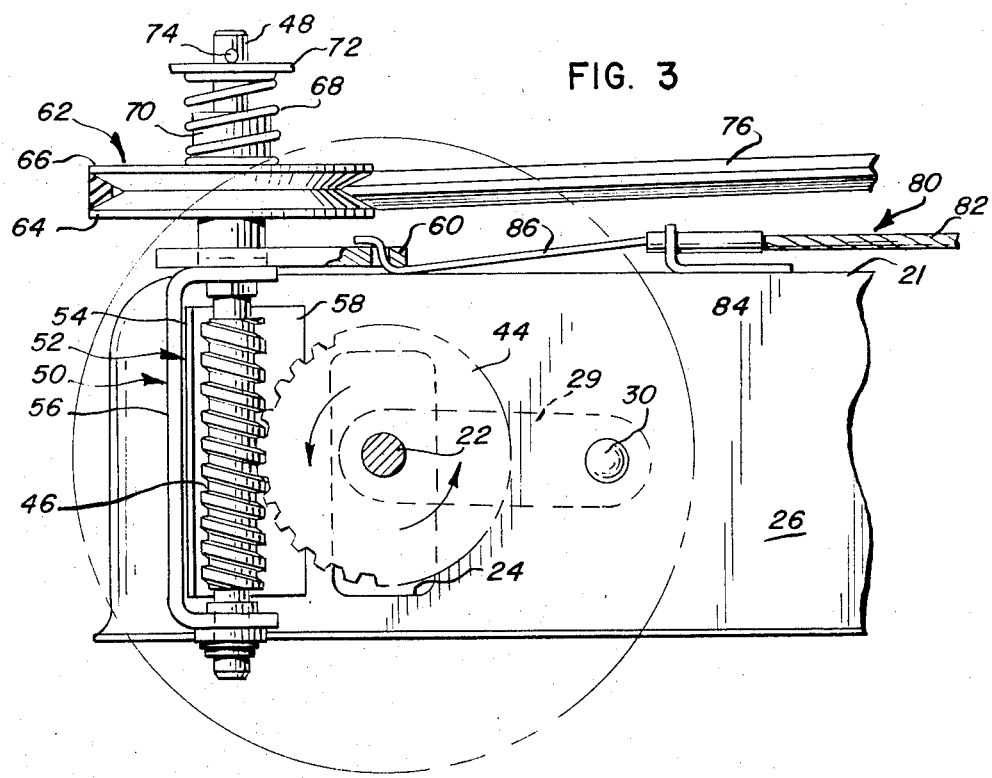
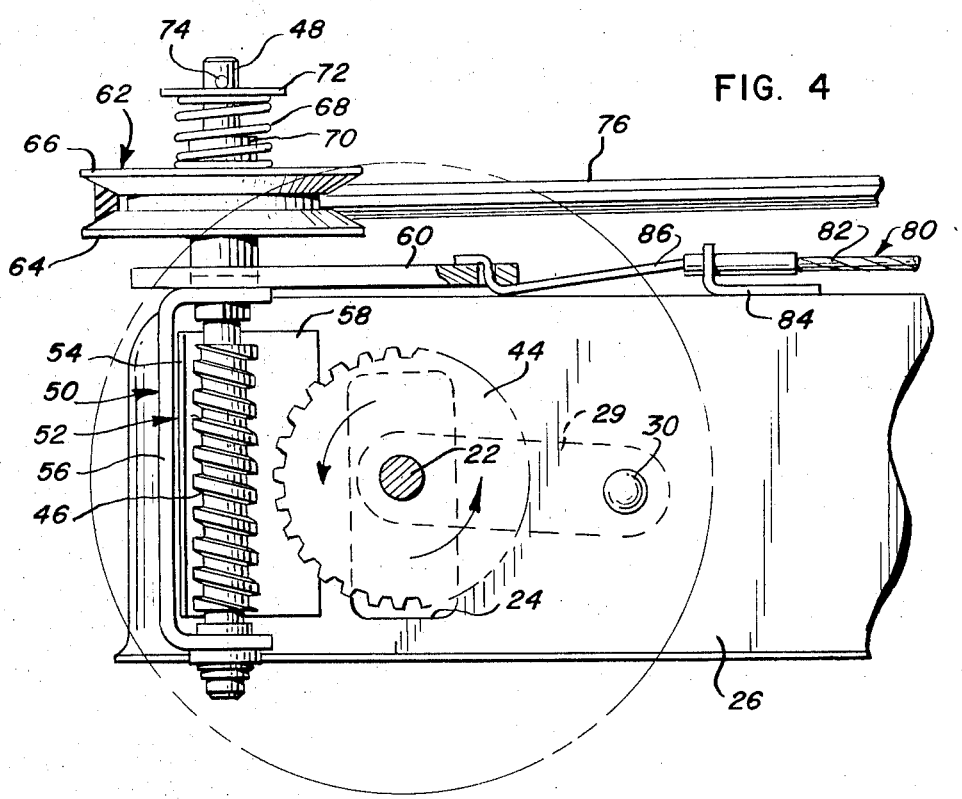

SELF-PROPELLED VEHICLE DRIVE

This invention pertains to a clutch-type apparatus for transmitting mechanical power between two relatively adjustable assemblies, and more particularly to providing an improved drive to an adjustable wheel or wheels of a self-propelled vehicle such as a power lawn mower.

It is an object of this invention to provide an improved drive system for self-propelled vehicles, such as lawn mowers.

It is another object of this invention to provide an improved clutch apparatus for selectively transmitting mechanical power from an adjustable machine frame to a support and transport subassembly.

It is another object of this invention to provide an improved clutch apparatus for selectively effecting a positive drive connection between two sections of a machine which are adjustable relative to one another.

It is a more particular object of this invention to provide an improved apparatus of the aforementioned type wherein the engaging components are positively and automatically retained in engagement with one another.

It is a further object of this invention to provide a drive arrangement meeting the aforementioned requirements and which is of a simple design, economical to manufacture and reliable in operation.

Further and additional objects and advantages of this invention will appear from the description, accompanying drawings and the appended claims.

In carrying out this invention in one illustrative form, a self-propelled vehicle is provided having a frame which is adjustable relative to a support wheel. A worm wheel is affixed to the axle of the support wheel to move and rotate therewith. An elongated worm screw is supported on the vehicle frame and extends adjacent the various relative positions assumed by the worm wheel as the frame is adjusted relative to the support wheel. The worm screw is laterally movable toward and away from the worm wheel. Drive means are provided on the frame for rotating the worm screw, including a flexible endless drive belt extending from the screw across the axis of the worm wheel, along with means for selectively moving the worm screw laterally into and out of engagement with the worm wheel, for selectively driving the support wheel in any such adjusted position of the frame.

For a more complete understanding of this invention, reference should now be had to the embodiment illustrated in greater detail in the accompanying drawings and described below by way of an example of the invention. In the Drawings:

FIG. 1 is a perspective view of a self-propelled walk-behind type lawn mower employing teachings of this invention;

FIG. 2 is an enlarged top view of a portion of the machine of FIG. 1;

FIG. 3 is a side view taken generally along line 3—3 of FIG. 2 with the wheel position indicated in outline;

FIG. 4 is a view similar to FIG. 3 with the clutch apparatus in a disengaged position;

FIG. 5 is a schematic view of a simplified over-center toggle mechanism for manual operation of the clutch mechanism of the machine in FIG. 1; and FIG. 6 is a schematic illustration of one arrangement for selectively adjusting the position of the frame on the wheels for adjusting the height setting of the mower of FIG. 1.

Referring first to FIG. 1, there is illustrated, somewhat schematically, a self-propelled, walk-behind type lawn mower 10. The illustrated mower includes generally a frame or housing 12, a handle assembly 14 attached to the housing 12 and extending rearwardly to a convenient position for grasping by the operator, front and rear ground engaging support wheels 16 and 17, and a motor 18. The motor 18 operates a cutting blade (not shown) which rotates in a generally horizontal plane within or beneath the frame housing 12. The frame 12 is vertically adjustable relative to each of the wheels 16 and 17 for adjusting the height of the aforenoted cutting blade above the ground to adjust the mowing height. It will be appreciated that the basic machine 10 is of generally conventional construction, and it may be of any of a wide variety of specific designs.

In the illustrated mower 10, a power take off drive is provided on the motor 18 by way of a pulley 20 which may, for instance, be attached to an extension of the cam shaft of the motor. The pulley 20 is positioned beneath the motor, relatively close to and parallel to the upper surface or deck 21 of the frame 12.

Referring now also to FIGS. 2–4, the front pair of wheels 16 are mounted on a common axle shaft 22 extending transversely of the frame 12 through vertically elongated openings 24 in the opposite side walls 26 of the frame housing 12. The axle 22 is journaled in a pair of weldment and bearing subassemblies 28 (FIG. 2) which include pivot links 29 mounted on pivot pins 30 secured to the respective side walls 26 at points spaced rearwardly from the respective openings 24. Only one opening 24, wall 26, bearing assembly 28 and pin 30 are shown in the drawings, however, similar components occur at the opposite side of the frame 12.

Vertical adjustment of the front of the mower frame relative to wheels 16 is obtained by pivotal adjustment of the assemblies 28 on pins 30. As shown in FIG. 6, a vertical link 32 is affixed to one subassembly 28 to form a bell crank arm. An operating rod 34 extends generally horizontally from the link 32 to an adjustment lever 36 which may be pivotally mounted on the frame housing 12 at any convenient location. Movement of lever 36 will rotate the bell crank arm 29-32 about pivot 30 to adjust the vertical position of the frame relative to axle 22, and thus relative to wheels 16. Suitable means are provided for retaining the lever 36 in any of a number of preselected positions, to thereby maintain the frame 12 and related components in a corresponding preselected vertical position. By way of one example, the lever 36 may be biased by a spring, as at 37, for engagement in any selected notch 38 of an adjacent retainer 40. The same type of arrangement may be provided for vertical adjustment of the rear pair of wheels 17. The rear wheel adjustment mechanism may be interconnected to the same lever 36 to thereby effect simultaneous coordinated adjustment of the frame on all four wheels in adjusting the cutting height.

Referring again particularly to FIGS. 2, 3 and 4, a drive and clutch arrangement 42 is provided for selectively driving the front pair of wheels 16 from the motor 18 in any position of vertical adjustment of the frame for propelling the mower. The mechanism 42 includes a worm gear wheel 44 affixed to the axle 22 in coaxial alignment with the front pair of wheels 16. An elongated worm screw 46 is provided of appropriate configuration for drive mating engagement with the teeth on the periphery of the worm wheel 44. The worm screw 46 is vertically positioned adjacent the forwardmost peripheral section of the worm wheel 44 with the longitudinal axis (axis of rotation of the screw) in the plane of rotation of the wheel 44. The screw 46 is of sufficient length to extend adjacent the opposed mating peripheral segment of the wheel 44 in all positions in which the wheel 44 may be placed as a result of the vertical adjustment of the frame housing 12 relative to the wheel assembly.

The worm screw 46 is affixed to a shaft 48 which is rotatably journaled in a U-shaped bracket 50. The bracket 50 is pivotally attached to the adjacent side wall 26 by a hinge 52 having one leaf 54 attached to the bight portion 56 of the bracket 50 and its other hinge 58 affixed to the adjacent side wall 26. An operating lever 60 is affixed to the bracket 50 and extends inwardly over the top deck of the frame 12.

A drive pulley 62 is provided on the upper end of shaft 48, and comprises a split or variable diameter V-pulley having lower and upper sheave elements 64 and 66. The lower pulley element 64 is affixed to the shaft 48. The upper element 66 is connected to the shaft 48 through an appropriate means, such as a spline or key and keyway, to provide a rotary drive connection therewith while permitting axial sliding movement of the pulley element 66 along the shaft 48. A compression spring 68 extends over the pulley hub 70 and is confined in compression between the upper surface of the element 66 and a bearing washer 72 which is retained by a suitable pin 74. An endless drive belt 76 of conventional V-belt configuration extends about the pulley 62 and the pulley 20 whereby the worm screw 46 is driven by the motor 18.

Pivotal movement of the bracket 50 about the hinge pivot 77 effects movement of the worm screw 46 toward and away from the worm wheel 44. Such movement also causes a change in the center distance between the pulleys 20 and 62. With a constant length belt, this change is accommodated by upward movement of the pulley element 66 against the force of spring 68, which reduces the effective diameter of the pulley 62 in the manner of a variable V-pulley, see FIG. 4. Since spring 68 constantly urges the pulley element 66 downward, to the maximum effective diameter position of the pulley 62, the spring loaded sheave arrangement assists in maintaining the requisite tension of belt 76.

A bowden cable or wire 80 is provided for manipulating the lever 60 from the operator's normal position at the rearward end of the handle assembly 14. One end of the bowden cable sheath 82 is attached to the frame 12 adjacent the outer end of lever 60 as by bracket 84. The corresponding end of the operator wire 86 is connected to the distal end of lever 60. Referring to FIG. 5, the opposite end of the sheath 82 is affixed to the handle 14, as by bracket 88, and the corresponding end of the wire 86 is attached to an over-center lever or toggle element 90 pivotally attached to the handle assembly 14. Movement of the lever 90 to its over-center or locked position of FIG. 5 rotates the operating lever 60 to retract the worm screw 46 from the worm wheel 44, as shown in FIG. 4. This also forces the belt 76 inward between the sheaves 64 and 66 of the pulley 62, as previously described.

Upon release of the lever 90 from its locked position, the tension forces applied by belt 76, including the driving tension force in the drive run and the tension forces caused by spring 68, will pivot the bracket and worm subassembly to the engagement position illustrated in FIG. 3 wherein worm 46 engages the worm wheel 44. Thereby, rotation of pulley 20 by motor 18 will transmit driving force to the worm wheel 44 and thus to the axle 22 and front wheels 16 for propelling the mower 10. Such engagement of the worm screw 46 with the worm wheel 44 will occur in the manner described regardless of the vertical adjustment position of the frame 12 and forward wheels 16 relative to one another, due to the fact that the worm screw 46 extends along all of the path of relative adjustment movement of the wheel 44.

It will be appreciated that the horizontal position of wheel 44 will vary somewhat over the range of relative height adjustment between the forward wheels and the frame, due to the fact that the shaft 22 moves along an arc centered upon pin 30. However, since the pulleys 20 and 62 are on opposite sides of the axis of shaft 44 and belt 76 extends across this axis, positive engagement of the mating gears 44 and 46 is provided by the tension forces in the drive belt despite any such variations. With a belt of appropriate length and a proper related adjustment range of the sheaves of pulley 62, positive engagement of the worm 46 with the wheel 44 is assured whenever the control lever 90 is released. Moreoover, as the wheels require greater torque, e.g., as in propelling the mower 10 up a hill, the belt tension will increase on the pulling side. This increase in tension will pull the worm 46 against the gear 44, thereby automatically increasing the inter-gear pressure as the load being transmitted through the gears increases so that the worm will not skip over the teeth on the wheel 44. Conversely, when relatively light propelling forces are required, the compressive load between the gear elements is reduced, thereby insuring that heavy pressure is applied only when required and thus reducing wear between the worm and the gear wheel.

Utilizing the belt forces to effect and maintain the gear engagement as described above results in a relatively light force requirement for the control operation, for instance as compared to an embodiment in which the worm 46 would be positioned on the other side of wheel 44 and be urged into engagement with the rear side of that wheel by control force applied in opposition to the tension forces in the drive belt. In the later arrangement the operational belt forces bias the system toward a disengaged position.

It will be obvious that other modifications of the specific embodiment shown may be made without departing from the spirit and scope of this invention. For example other wheel mounting and height adjustment mechanisms may be utilized, each wheel may be on a separate stub axle with an independent drive of the type described to one or more such wheels, and other belt adjustment and tightener mechanisms may be utilized to accommodate the change in center distances of the pulleys and to maintain a minimum required belt tension. By way of a specific example, a spring loaded idler system may be utilized. However, the specific embodiment illustrated and described has the advantages of simplicity, compactness and adaptation to adequate adjustment range with minimum clearance between the runs of the belt.

The preferred embodiment illustrated and described herein is advantageous in propelling relatively lightweight vehicles designed for low ground speeds, such as lawn mowers and similar lawn and garden implements. In such vehicles the speeds and load forces involved, as well as the relative ease of slippage of the driven wheels on the ground, will permit engagement of a rotating worm with a worm wheel which is stationary at the instant of engagement. It will be appreciated that the advantages of providing engagement over a range of positions of the worm wheel and the positive engagement forces provided by the mounting and drive arrangement also are applicable under other drive circumstances, for instance where higher gear speeds and/or greater drive forces are involved. In such circumstances, an appropriate additional clutch mechanism may be included by which the rotation of the worm may be stopped or its rotational velocity otherwise matched to the rotational velocity of the worm wheel prior to engagement. However, the illustrated drive system with a direct drive to worm presents advantages of simplicity and economy over such a drive device and has been found satisfactory for the application indicated.

It will be seen that improvements have been provided which meet the aforestated objects of the invention.

While particular embodiments of the invention have been described, it will be understood, of course, that the invention is not limited thereto since modifications may be made by those skilled in the art, particularly in light of the teachings herein. Therefore, it is contemplated by the appended claims to cover any such modifications as incorporate those features which may be said to constitute the essential features of these improvements, within the true spirit and scope of the invention:

What is claimed is:

1. A self-propelled vehicle comprising a frame, first means for supporting and transporting said frame, a worm wheel mounted on said first means, said worm wheel being disposed with its plane of rotation generally vertical and being operably connected with said first means to propel said vehicle when said worm wheel is rotated, an elongated worm screw mounted on said frame for engagement with said worm wheel, said worm screw being oriented with its longitudinal axis in said plane of rotation and extending generally vertically, second means adjustably joining said frame and said first means for effecting relative movement therebetween in either direction generally vertically and parallel to said axis of rotation of said worm screw to vary the height of said frame above a surface on which said vehicle is supported by said first means and thereby effecting corresponding relative movement of said worm wheel along said worm screw, said worm screw being of a length and so positioned as to extend adjacent each of the various relative positions assumed by an opposed mating peripheral segment of said worm wheel within the range of such relative adjustment movement therebetween by said second means, drive means supported on said frame for rotating said worm screw, and means for selectively effecting generally horizontal relative movement between said worm screw and said worm wheel into and out of drive mating engagement with one another in each of such relative vertical adjustment positions, for selectively effecting propelling operation of said support and transport means by said drive means in any of such relative vertical adjustment positions of said frame and said first means.

2. A self-propelled vehicle as in claim 1 wherein said worm screw is movably supported on said frame for movement laterally of the longitudinal axis of said worm screw into and out of engagement with said worm wheel.

3. A self-propelled vehicle as in claim 2 wherein said drive means comprises a flexible drive member extending transverse to the axis of rotation of said worm wheel.

4. A self-propelled vehicle as in claim 3 including an operating wheel coaxial with and fixed relative to said worm screw, said flexible drive member engaging said operating wheel and extending across said axis of rotation of said worm wheel.

5. A self-propelled vehicle as in claim 4 including a mounting bracket pivotally secured to said frame adjacent said worm wheel, said worm screw being journaled in said bracket.

6. A self-propelled vehicle as in claim 1 wherein said worm screw is pivotally supported on said frame for movement laterally of the longitudinal axis of said screw for engagement with and disengagement from said worm wheel.

7. A self-propelled vehicle as in claim 6 wherein said supporting and transporting means includes a support wheel, said worm wheel being coaxial with and fixed relative to said support wheel.

8. A self-propelled vehicle as in claim 7 wherein said support wheel and said worm wheel are fixed to a common shaft.

9. A self-propelled vehicle as in claim 1 wherein said first means includes an axle, a pair of support wheels fixed to said axle, and said worm wheel being fixed to said axle.

10. A self-propelled vehicle as in claim 1 wherein said drive means comprises a motor mounted on said frame.

11. A self-propelled vehicle comprising a frame, means for supporting and transporting said frame, said means including a support wheel and a shaft to which said wheel is fixed, said frame being adjustably supported on said means for movement to a plurality of predetermined positions relative to said means, a worm wheel fixed on said shaft in coaxial relation with said wheel to propel said vehicle when said worm wheel is rotated, an elongated worm screw disposed on one side of said worm wheel and extending adjacent the various positions assumed by said worm wheel in such relative adjustment of said frame and said means, said worm screw being pivotally mounted on said frame for movement laterally toward and away from said worm wheel for engagement with and disengagement from said worm wheel, a pulley attached to said worm screw, a motor mounted on said frame and having a drive pulley positioned on the opposite side of the axis of rotation of said worm wheel from said worm screw, and a flexible belt extending about said pulleys for rotating said worm screw, and means for selectively moving said worm screw and said worm wheel into and out of drive mating engagement with one another for effecting propelling operation of said support and transport means by said motor in any of such relative adjustment positions.

12. A self-propelled vehicle as in claim 11 wherein said pulley attached to said worm wheel is a V-pulley having one side axially adjustable relative to the other side thereof and means resiliently urging said sides together, and said belt being a V-belt.

13. A self-propelled lawn mower comprising a frame, a cutting blade supported on said frame, means for supporting and transporting said frame, said frame being adjustably supported on said means for movement to a plurality of predetermined positions relative to said means, a worm wheel operably connected with said means for operating said means to propel said vehicle when said worm wheel is rotated, said worm wheel being mounted for movement relative to said frame as the relative positions of said frame and said means are adjusted, an elongated worm screw mounted on said frame, said worm screw being disposed on one side of said worm wheel and extending adjacent the various positions assumed by said worm wheel in such relative adjustment of said frame and said means, a pulley attached to said worm screw, a motor mounted on said frame and having a drive pulley positioned on the opposite side of the axis of rotation of said worm wheel from said worm screw, a flexible belt extending about said pulleys for rotating said worm screw, and means for selectively moving said worm screw and said worm wheel into and out of engagement with one another for effecting propelling operation of said support and transport means by said drive means in any of such relative adjustment positions.

14. In a self-propelled vehicle including a frame, first means for supporting and transporting said frame, second means adjustably joining said frame and said first means for effecting relative movement therebetween generally vertically in either direction to vary the height of said frame above a surface on which said vehicle is supported by said first means, the improvement comprising a worm wheel mounted on said first means, said worm wheel being disposed with its plane of rotation generally vertical and being operably connected with said first means to propel said vehicle when said worm wheel is rotated, an elongated worm screw mounted on said frame for engagement with said worm wheel, said worm screw being oriented with its longitudinal axis in said plane of rotation and extending generally vertically and parallel to the direction of such relative height adjustment movement between said frame and said first means, whereby said worm wheel has relative movement along said worm screw during such height adjustment movement, said worm screw being of a length and so positioned as to extend adjacent each of the various relative positions assumed by an opposed mating peripheral segment of said worm wheel within the range of such relative adjustment movement therebetween by said second means, drive means supported on said frame for rotating said worm screw, and means for selectively effecting generally horizontal relative movement between said worm screw and said worm wheel into and out of drive mating engagement with one another in each of such relative vertical adjustment positions, for selectively effecting propelling operation of said support and transport means by said drive means in any of such relative vertical adjustment positions of said frame and said first means.

15. Apparatus as in claim 14 wherein said worm screw is movably supported on said frame for movement laterally of the longitudinal axis of said worm screw into and out of engagement with said worm wheel.

\* \* \* \* \*